(No Model.) 2 Sheets—Sheet 1.
C. E. EMERY.
EMERGENCY ELECTRIC GENERATING APPARATUS.
No. 583,173. Patented May 25, 1897.
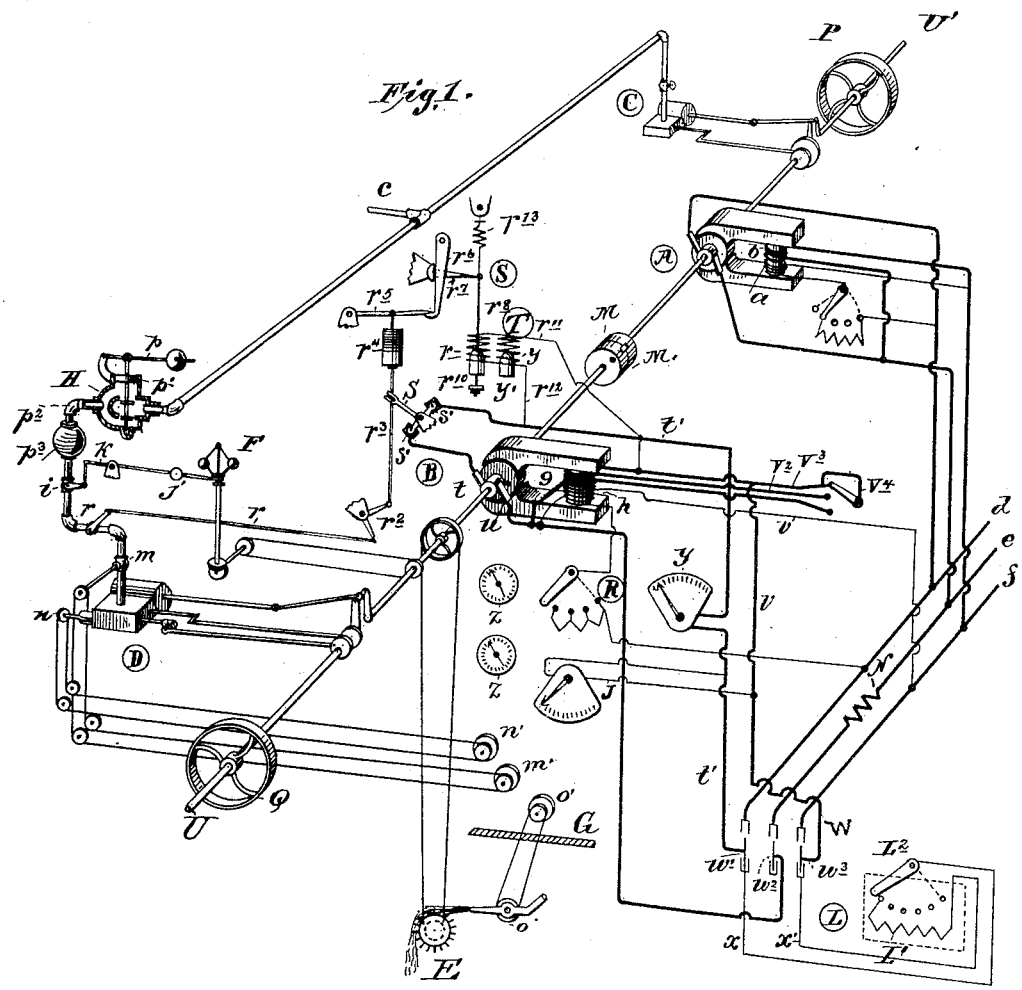

(No Model.) 2 Sheets—Sheet 2.
C. E. EMERY.
EMERGENCY ELECTRIC GENERATING APPARATUS.
No. 583,173. Patented May 25, 1897.
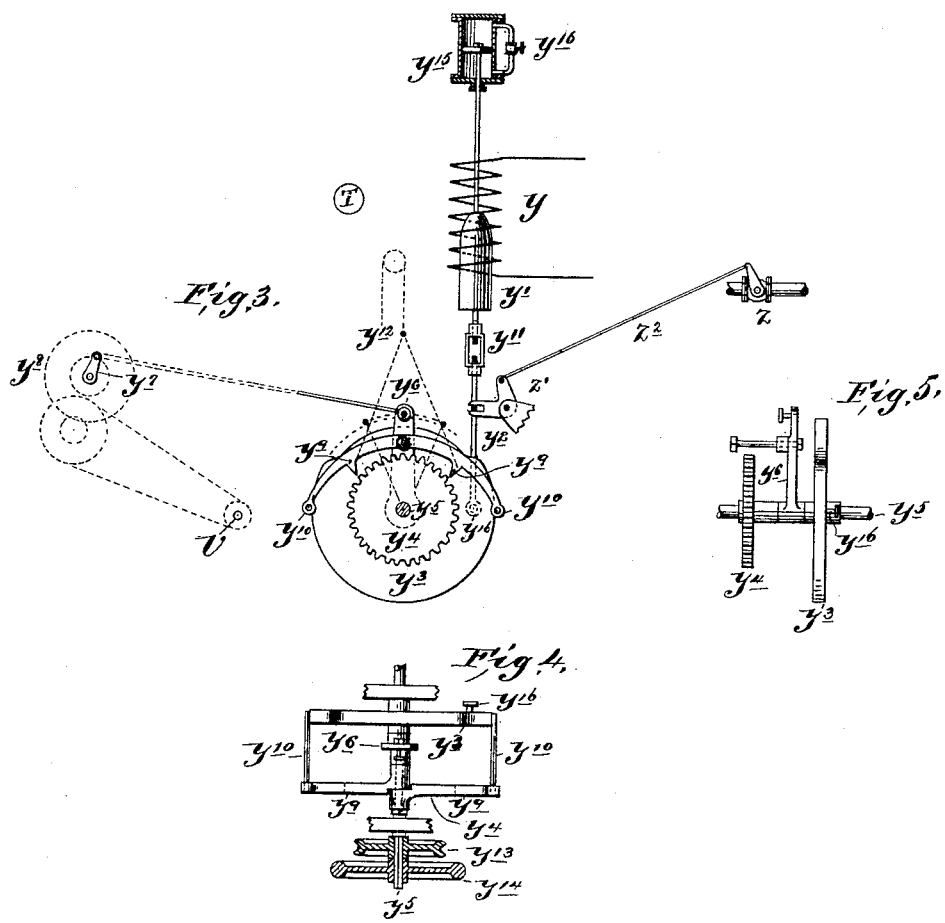

UNITED STATES PATENT OFFICE.

CHARLES E. EMERY, OF BROOKLYN, NEW YORK.

EMERGENCY ELECTRIC GENERATING APPARATUS.

SPECIFICATION forming part of Letters Patent No. 583,173, dated May 25, 1897.

Application filed August 22, 1895. Serial No. 560,140. (No model.)

*To all whom it may concern:*

Be it known that I, CHARLES E. EMERY, of Brooklyn, Kings county, New York, (office New York city,) have invented certain new and useful Improvements in Emergency Electric Generating Apparatus; and I do hereby declare that the following is a full, clear, and exact description of the same, reference being had to the accompanying drawings, making part of this specification.

In the application of electricity to electric lighting the demand for light during the day and the latter part of the night is very small, but is proportionally very high in the early evening. So, also, in electric traction the output of the electric generators during the "rush hours" at morning and evening is very much greater than at other times of the day. Ordinarily, however, electric generators with steam-engines and steam-boilers or other sources of power necessary to operate them must be provided for the maximum loads, and the capital invested in that part of the apparatus used but a few hours a day represents a very fair proportion of the total capital required. Methods employed to overcome the difficulty are to force the plants beyond rated capacity during the heavy loads, which can only be done at some risk and unusual cost for repair, or large storage batteries are employed, energized when the loads are low and drawn upon when they are high.

The object of this invention is to supply the increased demand for electric current during rush hours by means of a simple form of apparatus, which can be furnished at a lower cost than that customarily employed and operated at a less expense than by overloading machinery already in place. To accomplish this purpose, it is proposed to use in parallel with ordinary constant-potential electric generators one or more simply-constructed series-wound electric generators operated singly or jointly by a simple form of steam-engine or by a water-wheel or other prime mover regulated by a throttle-valve, but without a governor, or with an overloaded one inoperative at customary speeds, which will therefore permit the engine to race until checked by the load at the speed necessary to maintain the voltage fixed by the other generators. The voltage cannot ordinarily greatly rise above that supplied by the other generators, for by the slightest rise the current through the latter will be decreased and the load thrown onto the series dynamo, which, receiving only a practically constant supply of energy through the throttle-valve, can only supply a limited amount of current, though free to run at a speed to bring its voltage up to that of the other generators. Such a series-wound generator so operated will furnish substantially constant current when the steam-pressure supplied to the engine operating the same is kept substantially constant, and the voltage is maintained substantially constant by means of the regular generators in the station operated in the usual way. Series-wound generators operated by racing prime movers may therefore be employed to reduce the load of the regular generators to the extent of furnishing nearly the whole of the minimum current required during regular periods, the excess only being supplied by the regulator-generators in the customary way. The advantage due to using a series generator is that it is comparatively cheap and simple in construction and may be operated and even overloaded with less difficulty from sparking, as the exciting force is substantially proportioned to the output.

The invention therefore consists of the combination of the two kinds of generators in parallel, together with methods of operation and regulation, and various features and combinations relative to the electric and power plants by means of which the operations desired may be secured with certainty and safety. The various regulating devices also permit the use of series generators for constant-potential work of certain kinds without operating same in connection with constant-potential generators.

The voltage delivered at the terminals of a series-wound electric generator is practically proportioned to the current and speed, and as the work done is proportioned to the product of the current and velocity it follows that if the steam-supply of the operating-engine be kept substantially constant the product of the simultaneous voltage and current, equal to the watts or work done, will be substantially constant and the current delivered at a constant potential will also be practically constant. In other words, if the speed of the operating-engine be once made such that with a given prearranged current the electromotive force generated will equal the difference in electromotive force between the "bus-bars" in an electric generating-station connected to the main conductors of the external circuit and the terminals of such series-wound dynamo be connected to such bus-bars the dynamo will deliver a constant current to the main circuit so long as the potential remains constant and the supply of steam is constant. If provision be made to keep the steam-pressure constant and the steam-supply to the engine flows through an orifice of definite size, the weight of steam delivered will not greatly vary, and if under such conditions the voltage rises for any reason this will tend to hold back the current and the engine operating the series generator will "race" or run faster until the electromotive force generated balances that of the line, but the current will remain less than before, so that the product of voltage and current, or the watts representing the work, will be practically the same as before, though the results may be modified slightly by variations in the weight of steam flowing under such conditions. On the other hand, if the voltage falls the current must increase in order to absorb the power of the engine, when the watts will remain the same as before, modified only by any slight variation in steam-supply above referred to—that is, with such an arrangement the series generator will continue doing practically the same work, although the voltage changes within customary limits and will to that extent continually relieve the constant-potential generators, with the simple result that all demands for current not supplied by the series or constant-current dynamo must be furnished by the constant-potential dynamos and the latter be relied upon to regulate the voltage while supplying the excess of current.

In the drawings, Figure 1 represents an isometric view, somewhat distorted, of the principal apparatus in a central station necessary for the operation of my invention. The drawing is in the main diagrammatic, the different parts being shown only in sufficient detail to enable them to be identified by the eye. Fig. 2 is a longitudinal vertical cross-section of a steam-chest, showing the main valve and riding adjustable cut-off valves. Fig. 3 is a vertical elevation, largely diagrammatic and partly in section, of the potential regulator T, a fragment of which is shown in Fig. 1. Fig. 4 is a plan view of the lower portion of the apparatus with parts in section. Fig. 5 is a side view of the same with pawls removed.

In Fig. 1, A represents an ordinary constant-potential dynamo, the field being excited principally by a shunt-coil $a$. A series coil $b$ is provided simply for the purposes of regulation and technically compounds or overcompounds the dynamo, as is customary. The dynamo A is intended to typify any and all forms and any number of constant-potential dynamos as employed in practice in a generating-station.

C represents in diagrammatic form an engine for operating the dynamo A. Such engine is supposed to be and is roughly represented as provided with a fly-wheel governor to maintain the engine at approximately constant speed.

The engine C is simply intended to typify any number and form of engines required to operate the dynamos at a particular location. Steam for the engine is taken from a suitable boiler or boilers through a suitable pipe and steam-main, (designated $c$.) The station bus-bars are designated $d\ e\ f$, of which the exterior ones, $d\ f$, are connected to the external circuit and the center one, $e$, is connected between an armature-brush and the series field of each of the several dynamos, its object being to prevent the magnetism in the field of any particular machine from becoming reversed.

The description thus far is intended to typify the construction of an ordinary constant-potential plant in an electric light or power station independent of the number of units in use or their exact type or arrangement.

B designates a series-wound or approximately constant-current generator, of which the main field-coil $g$ is excited in series with the armature. A small shunt-coil $h$, insufficient to produce the desired electromotive force, is preferably supplied, but used principally in building up the magnetism in the machine at starting. The dynamo is shown operated by an engine D or at will by a water-wheel E.

The engine D would, in general, be of a type provided with a cut-off normally fixed, but, adjustable by hand, like that of the familiar marine type shown in Fig. 2, in which a main slide-valve K is provided with openings through the ends, regulated by sliding plates I I on the back, the distance apart of which, and therefore the point of cut-off, can be regulated by revolving a valve-stem provided with right and left hand threads for operating the valves. The revolution of the valve-stem is effected through a wheel $n$, (grooved for a cord or chain in this case,) secured to turn with such stem. This familiar arrangement is shown only to typify any customary means of varying the cut-off of a steam-engine at will by hand.

F is a steam-engine governor operated from the shaft of engine D and connected to regulate a throttle-valve $i$ in the steam-pipe through a lever $k$, but in operation the governor would be overloaded—that is, so loaded, for instance, by an adjustable weight $j$ that the balls would not rise to shut off the steam until the engine had reached a speed greater than that required to produce the voltage under ordinary conditions—thus permitting the engine to race or change its speed with the resistance within certain limits. Generally the engine is to be run at a point of cut-off sufficient to amply do the work with the steam-pressure available, when the voltage is to be regulated by varying the speed of the engine with an ordinary throttle-valve $m$.

G is intended to represent the floor of a switchboard and regulating-gallery or location where electrical instruments and regulating-rheostats are arranged in the customary way. Upon the switchboard it is desirable to arrange a voltmeter J, connected across the terminals of the dynamo B, and an ammeter $y$, showing the current delivered by such generator. Steam-gages $zz$ are also desirable to show the pressure in pipe $c$ and reservoir $p^3$. Upon and about the platform are also to be arranged the several rheostats and switches hereinafter described. Within convenient reach of such operating-platform G is also provided an operating-wheel $m'$, mechanically connected to the stem of the throttle-valve $m$, in this case by means of a cord leading to a pulley on the stem of the throttle-valve from a pulley attached to the side of the operating-handle $m'$. The cut-off pulley $n$ is shown similarly connected to an operating-wheel $n'$ near operating-platform G. So, also, a throttle valve or gate $o$ in the supply-pipe of the water-wheel E is shown similarly connected to an operating-wheel $o'$, also arranged within convenient access of the operating-platform G.

In order to supply the steam-engine D with steam at a constant pressure, such pressure is fixed a little below that regularly supplied from the main steam-pipe $c$, and in the pipe leading to the engine is arranged a regulating-valve H of any common construction, but shown with two double-puppet piston-disks with corresponding seats. The valve is forced down to open by a weighted lever $p$ and pushed upward and closed by the steam-pressure that passes the valves acting on a piston $p'$, the upper surface of which is open to the atmosphere. It follows, therefore, that the pressure delivered at the outlet $p^2$ of the valve will be maintained at such a point that the pressure on the piston $p'$ will balance the weights on the lever $p$. Between the outlet of the valve H and the cylinder of the engine is a reservoir $p^3$ of any desired size to maintain a supply of steam at constant pressure for the engine. Where the pipes are large, they will form a sufficient reservoir, and the special one $p^3$ may be omitted.

The generator B and engine D, as shown, are intended only to typify a duplication of either generators or engines, or both, differing perhaps in ordinary details of construction, but operating on the same system.

M M' severally represent half-couplings on the main shafts U' and U of the dynamos A and B. As represented, the two can be coupled together, and thereby the engines and dynamos connected, by a square radial key held in position by a longitudinal pin. Under normal conditions of operation these couplings are disconnected, and the two engines and dynamos are independent so far as mechanical connection is concerned, but the engine-shafts may be connected in case of accident. Each engine would in practice be provided with the customary details of a steam-engine, all of which are not shown. The fly-wheel P of engine C for constant potential would be heavy as is customary, while the fly-wheel Q for engine D, operating the series-wound generator, should be comparatively light to permit the speed to change promptly with the voltage. In the steam-pipe supplying the engine D is also another throttle-valve $r$, operated by the vibratory movement of an attached lever, which through mechanical connections—for instance, link $r'$, bell-crank $r^2$, and vertical connection $r^3$, carrying a weight $r^4$—connects to the short arm of a lever $r^5$, and the end of the longer arm thereof, in the position shown, catches upon the hook end of a pendent lever $r^6$, and in this way the valve $r$ is normally held open. To the connection $r^3$ is pivoted one end of a three-crank lever $s$, the opposite arms of which are of conducting material insulated from the remainder of the lever and bear upon plates $s'$ and complete the circuit of generator B, being shown as closing a gap in conductor $t'$, leading from brush $t$ to a point connectible at will, in a manner hereinafter to be described, with the bus-bar $d$.

The coil $r^9$ and weighted core $r^{10}$ form a solenoid, the terminals $r^{11}$ and $r^{12}$ of which connect with the terminals $t$ and $v$ of the generator B. The core $r^{10}$ of the solenoid is partly supported by a coil-spring $r^{13}$, and the connection $r^8$ articulates with the horizontal arm of the lever $r^7$, which at its fulcrum is provided with double arms which severally press for motion in either direction against the pendent lever $r^6$. The tension of spring $r^{13}$ and the distance of the vertical arms of the double bell-crank $r^7$ from pendent lever $r^6$ are so adjusted that when the difference of potential between the brushes $t$ $u$ varies in either direction beyond a predetermined limit the solenoid-core $r^{10}$ will rise or fall and move the pendent lever $r^6$ and release the lever $r^5$, permitting the weight $r^4$ to drop and through the connections described break the main circuit of the generator at the plates $s'$ and at the same time shut off the steam by means of valve $r$ nearly or fully, as may be arranged, in an evident manner. This apparatus as a whole is designated S and is called a "potential cut-out," as it operates by change of potential.

T in general designates a potential-regulator, only part of which—viz., the solenoid, which forms the initial operating device—is shown in Fig. 1. The complete apparatus is shown in Figs. 3 to 5. The coil of the solenoid is designated $y$ and is excited from the shunt-circuit across the terminals of dynamo B the same as coil $r^9$. The core of the solenoid (designated $y'$) is attached to a rod $y^2$, Fig. 3, which is connected to a pin in a disk $y^3$, mounted concentrically with a ratchet-wheel $y^4$, secured to a shaft $y^5$, which is mechanically connected to operate a throttle-valve or adjust a cut-off valve. Such ratchet may, for instance, be mounted on the shaft of the operating-wheel $m'$, Fig. 1, operating throttle-valve $m$, or on the shaft of the operating-wheel $n'$, operating cut-off-valve-regulating wheel $n$. A pawl-lever $y^6$, Figs. 3 to 5, is also pivoted concentrically with the same shaft and vibrated continuously in any convenient way—for instance, by a crank $y^7$ on the shaft of the wheel $y^8$, which through intermediate gear or belts receives motion from a revolving shaft—for instance, shaft U of dynamo B, Fig. 1. Hinged to the lever $y^6$, Figs. 3 to 5, are two pawls $y^9 y^9$, pointing in opposite directions, which when permitted to fall engage with the teeth of the ratchet-wheel $y^4$. These pawls are omitted in Fig. 5 for clearness of illustration. The pawls are lifted out of engagement with the ratchet-wheel by a cam $y^3$ acting on pins $y^{10} y^{10}$, attached to extensions on such pawls, except when such cam is partly rotated by the solenoid-core, thereby bringing the low side of the cam (shown at the top) to one side, so that one of the pawl-supporting pins $y^{10}$ will slip inwardly and permit the pawl to engage with the teeth of the ratchet-wheel $y^4$ until forced out by such cam. When the solenoid-core $y'$ is in the position due to the desired voltage, the cam is so set by means of a turnbuckle $y^{11}$ in rod $y^2$ that the pawls $y^9$ are both kept up, so as not to operate the ratchet-wheel $y^4$; but as soon as the solenoid moves in either direction one or other of the pawls is lowered and engages with the ratchet-wheel and moves it by a "step-by-step" motion, thereby in an evident way adjusting the throttle-valve or cut-off of the engine proportionally to the potential and dispensing with or supplementing hand regulation thereof.

When hand regulation by turning the shaft $y^5$ is desired, the pawls $y^9$ are lifted, for instance, by strings $y^{12}$, running over a pulley to a convenient point. A hand-wheel $y^{14}$ is shown attached to shaft $y^5$, and also attached thereto is represented a grooved pulley $y^{13}$ to connect with throttle-valve of cut-off wheels $m$ or $n$, Fig. 1.

At times, and particularly when series dynamos are used independently, it is desirable to have the potential-governor operate the cut-off.

By properly proportioning the parts the solenoid-core may be employed to regulate the steam-supply without the "mill-governor" described. For instance, if $z$ be a throttle-valve in the steam-pipe supplying the engine D it may be operated by direct mechanical connections with rod $y^2$, a bell-crank $z'$ and link $z^2$ being shown for the purpose.

A dash-pot $y^{15}$ is preferably attached to the rod $y^2$ of solenoid-core, with pass-by and adjustable cock $y^{16}$ to check the vibration.

The series coil $g$ of the generator B, Fig. 1, is to be provided with some well-known method of varying its induction. In the drawings, $v' v^2 v^3$ are conducting-leads connected at different positions in the length of the coil $g$, and $v^4$ is a switch for connecting the terminal $v$ of the dynamo with either of the leads, thereby in effect cutting out a certain number of turns. This device is meant only to typify any equivalent shunt or other device which will accomplish the purpose of reducing the induction of the series coil.

W designates, in general, a double triple starting-switch, of which $w'$, $w^2$, and $w^3$ represent movable blades operable separately, or in certain cases in pairs or jointly, as yet to be described. The blade $w'$ is connected through connection $t'$ with brush $t$ of generator B, and by the movement of said blade $w'$ such brush may be connected at will to the bus-bar $d$ or, as shown, to a connection $x$, leading to an artificial line L, yet to be described. The blade $w^3$ is connected to terminal $v$ of generator B, and by the movement of such blade conductor $v$ may be connected either with station bus-bar $f$, as shown, or with a conductor $x'$ of the artificial line L. Blade $w^2$ is connected to the brush $u$ direct, and by the movement of such blade brush $u$ can be connected to the intermediate bus-bar $e$ or at will cut off from the same, as shown in the drawings.

L shows an artificial line containing a resistance L′, which may consist of small wire under water or other poor conducting fluid, which can be cut out in sections at will by a rheostat L². The terminals of this rheostat are the conductors $x$ and $x'$ above referred to. In the position shown the dynamo B is connected to the artificial line—that is, through the resistance L′.

The operation of the apparatus is as follows: Preferably the constant-potential apparatus, typified by generator A and operating engine C and connections, is first put in regular operation, so that current is delivered to the external circuit through bus-bars $d$ and $f$. When the output has risen so high that it is desirable to use the emergency apparatus, the valve $r$ in steam-pipe of engine D is opened by locking up the weight $r^4$ and thereby closing a break in the circuit of the emergency-generator B with the safety-switch $s$. The switch V⁴ is preferably to be set at the maximum induction—that is, with all the series coils $g$ active. With engine D stopped the regulating-valve H in steam-pipe will be thrown open by the weighted lever $p$ and the balls of governor F will be down, thus opening throttle-valve $i$. The cut-off of the engine may be thrown off in starting, but is finally to be adjusted at a point previously determined by means of wheel $n'$. The blades $w'$, $w^2$, and $w^3$ of switch M are to be in the position shown, so that the main terminals of emergency-generator B will be connected to artificial line L. The engine D may then be started by operating the throttle-valve $m$, when by means of switch R in the shunt-circuit of such emergency-dynamo B the field may be feebly excited with the small shunt-coil $h$, so that current will be generated which will build up the magnetism of the field and the voltage (shown by voltmeter J) will rise, when by means of rheostat L' and throttle-valve-operating handle $m'$ the speed, voltage, and current may be adjusted substantially as is desired in regular operation. The switches at W may then be operated part way, so as to connect conductors $t'$ and $v$ with bus-bars $d$ and $f$ without at first cutting off the connection with the artificial line L. As soon, however, as the engines C, operating constant-potential dynamos, steady themselves after being relieved of part of the load the blades $w'$ $w^2$ $w^3$ of switches W may be thrown entirely across and the emergency-dynamo connected regularly to bus-bars $d$ $e$ $f$ and disconnected from the artificial line L. The operation will then be substantially as described at the outset. Steam at constant pressure through regulating-valve H will, by the throttle-valve $m$, be admitted sufficiently to maintain the speed necessary to produce the voltage, when the speed of engine will automatically vary for reasonable variations in voltage. When operation is regularly established, minor regulations will in general be made with the throttle-wheel $m'$, but the cut-off wheel $n'$ may be also used separately or conjointly.

The offices of a considerable number of the details described are simply to provide for conditions of abnormal working. If the steam-pressure supplied to $c$ should fall so that engine D fails to keep up its speed and maintain its voltage, the cut-off of such engine must be varied by wheel $n'$ and series-field rheostat $v^4$ of emergency-generator B, adjusted to give full induction, so that the least amount of current will be required to maintain the desired voltage. If, however, the steam still continues to fall, so that the engine D cannot maintain the speed for the required voltage, or if from bad compounding of constant-potential dynamos A they persist in running the voltage higher than can be maintained at the moment by emergency-dynamo B, the current may become reversed through the armature of such generator B, thus throwing the load off the engine D, but the speed of the engine will be checked as soon as it rises to a predetermined point fixed by the weight $j$ on lever of governor $f$, as such governor-balls will rise and cut off the steam at throttle-valve $i$. Generally, however, before this time the potential between the terminals of emergency-generator B will have lowered sufficiently to drop the solenoid-core $r^{10}$, thereby releasing the weight $r^4$ and shutting off the steam at throttle-valve $r$ and at the same time opening the circuit of emergency-dynamo at switch $s$. Evidently the same operation will take place if the line is in any way opened near the station, throwing the load off all the dynamos. If by the blowing out of line fuses or for any other reason the load suddenly decreases, so that the current from the emergency-dynamo B is more than the total required and the counter electromotive force of constant-potential generators A prevent such generators from taking the surplus current as motors, the voltage will be determined by the emergency-dynamo B and will rise, according to principles previously stated, until the current is so reduced that the line and connections will take it, but if before that the voltage rises above a prearranged point the solenoid-core $r^{10}$ will be pulled farther upward within the coil, the weight $r^4$ released, and the steam shut off by throttle-valve $r$ at the same time that the circuit of emergency-dynamo is broken by switch $s$, when the constant-potential dynamos will be left in operation to supply the line. In case of a heavy short circuit on the line generally the ordinary safety-catches will be blown and the emergency-dynamo engine be regulated or stopped by the steam-engine governor F or the potential-governor T. By omitting current safety-catch in circuit of emergency-dynamos or setting the same for abnormally high current these dynamos can be kept at work at reduced voltage and heavy current, requiring substantially constant power.

In first starting the emergency-dynamo B the series coil $g$ would be worked with full induction, under which condition for a given speed a minimum current will be required to keep up the voltage. Under such circumstances a reasonable demand for more current may be met by admitting more steam; a still greater demand by lengthening the cut-off, but the extra current will have the effect to slow the engine, for the reason that as the exciting force due to the series coils is increased the voltage will be kept up with less speed. The reduction in speed reduces the power of the engine, so that for very greatly increased demands for current the engine might not be large enough to carry the load at an economical point of cut-off. In such case the induction of series coil $g$ may be decreased by cutting out turns of coil with rheostat $V^4$, when a higher speed will be required to keep up the voltage with the decreased number of turns and the power of the engine be increased proportionally.

Though the emergency-dynamo B will operate without shunt-coil $h$, it is under many conditions desirable to use said coil in regular operation, for with the field that it produces steadily maintained less change of speed will be necessary to follow the changes in voltage.

In order to prevent the field of the emergency-dynamo from being reversed under abnormal conditions above outlined, it is preferred to connect the brushes of all the dynamos of the sign-supplying series turns to an intermediate bus-bar $e$, substantially as is customary in some plants, when if the voltage of one dynamo falls current from the other dynamos will be forced through the series coil of that dynamo in the right direction to prevent reversal of the field. This arrangement has already been described in detail in relation to emergency-dynamo B and can be traced out for the constant-potential dynamo A. Since, however, the resistance of the series coil of the emergency-dynamo must be much greater than that of the series coils of the constant-potential dynamos in order to excite the former with its own current, it is necessary to insert a resistance N somewhere in the conductor between the connection of the series coil of the emergency-dynamo B and that of constant-potential dynamos A. It is not to be understood that the use of the intermediate bus-bar $e$ is essential in the operation of the series dynamo B. The connection thereto simply adds another safeguard, such as is customary with ordinary generators. The arrangement may also be conveniently used in starting the emergency-dynamo, thus dispensing with the use of the shunt-coil $h$ by making the blades $w'$ $w^2$ $w^3$ of switch W operable separately and in starting throwing blades $w^2$ $w^3$ part of the way over, so that the conductor $v$ at one end of series coil $g$ will be connected at the same time both to bus-bar $f$ and one branch of the artificial line L and the other end of series coil at $u$ connected to bus-bar $e$, the other conductor $t'$ remaining connected to the other branch of the artificial line. In such case current from the dynamos then in operation will divide between the several series fields and feebly excite the field-magnet of emergency-generator B, and such magnetism will immediately build up by the passage of current through the artificial line until when everything is ready the blade $w'$ can be thrown over and finally the change made from the artificial to the main line in the way previously described.

Ordinarily the steam-supply to the engine D of emergency-dynamo B will be regulated by the potential-governor T, operating in the manner previously described. By the use of this governor it is possible to use series dynamos on a circuit without constant-potential dynamos in parallel therewith, particularly where the potential need not be maintained with accuracy. Supposing the series dynamo once adjusted for constant potential and supplying the required current, if more current is required the potential will simply fall and the current be supplied. Meanwhile the constant-potential governor T will within limits gradually increase the steam-supply and raise the potential. If the supply for extra current then ceases, the potential will run too high for a while, but cannot exceed a certain predetermined point, for the reason that the engine check-governor F will check the speed of the engine, and the potential cut-out S will, if necessary, stop the engine. Practically the same operations will take place if there is a demand for less current than is normally supplied by the series dynamos, as the potential will rise until checked by the engine check-governor F, safety will be secured by the potential cut-out, and meanwhile the comparatively slow adjustment by the potential-governor will bring matters back to normal conditions.

Since both the constant-potential dynamo A and the series or emergency dynamo B have both series and shunt coils, in this specification a series dynamo is understood to be one in which the principal field excitation is derived from the series coil.

What I claim as my invention, and desire to secure by Letters Patent, is—

1. The combination with a constant-potential dynamo and a prime mover for operating the same of a series dynamo in parallel therewith operated by a racing prime mover, substantially as and for the purposes specified.

2. The method of regulating a series dynamo for constant potential, which consists in mingling the current therefrom with current of substantially constant potential and furnishing a constant source of energy to drive such series dynamo so that its speed will be fixed by the potential, substantially as and for the purposes specified.

3. The method of regulating a series dynamo in parallel with a constant-potential dynamo, which consists in imparting to such series dynamo substantially a constant supply of energy and permitting the speed to vary, substantially as and for the purposes specified.

4. In combination with an emergency-dynamo and with an engine operating the same arranged to change its speed with the resistance, an overloaded governor combined and arranged to regulate the speed of such engine after it has passed above a certain prearranged limit.

5. In combination with a series dynamo and a prime mover for operating the same, a potential cut-out operating to cut the dynamo out of the main circuit and shut down the steam-supply when the potential rises above a certain predetermined limit, substantially as specified.

6. In combination with a series dynamo and a prime mover for operating the same, a potential cut-out operating to cut the dynamo out of the main circuit and shut down the steam-supply when the pressure falls below a certain predetermined limit, substantially as specified.

7. In combination with a constant-potential dynamo and a series dynamo arranged to be operated in parallel, an artificial line for starting the latter in combination with means for preliminarily exciting its field, substantially as and for the purposes specified.

8. In combination with a constant-potential dynamo and a series dynamo arranged to be operated in parallel, an artificial line for starting the latter in combination with a field-equalizing bus-bar and suitable switches whereby the series dynamo may be preliminarily excited through its series coil by other dynamos while operating on the artificial circuit.

9. In combination with a constant-potential dynamo and a series dynamo connected in parallel and with series fields connected to an independent bus-bar, a resistance placed in the connections of such bus-bar between the series and constant-potential dynamo, substantially as and for the purposes specified.

10. In combination with a series dynamo operated by a racing prime mover, a regulator for changing the induction of the series-field exciting-coil and thereby the speed of prime mover for a given number of amperes delivered at constant potential, substantially as and for the purposes specified.

CHAS. E. EMERY.

Witnesses:
HOWARD P. OKIE,
J. A. RUOFF.